United States Patent
Bishop

(10) Patent No.: US 7,055,515 B2
(45) Date of Patent: Jun. 6, 2006

(54) SAW BLADE WITH VARIED FINISHING ELEMENTS

(75) Inventor: Ralph Carl Bishop, 2 Point La., P.O. Box 875, Shelter Island, NY (US) 11964

(73) Assignee: Ralph Carl Bishop, Shelter Islands, NY (US)

( * ) Notice: Subject to any disclaimer, the term of this patent is extended or adjusted under 35 U.S.C. 154(b) by 0 days.

(21) Appl. No.: 10/863,796

(22) Filed: Jun. 8, 2004

(65) Prior Publication Data

US 2005/0268898 A1 Dec. 8, 2005

(51) Int. Cl.
*B28D 1/04* (2006.01)
*B23D 57/00* (2006.01)
*B27B 33/02* (2006.01)
*B23B 51/00* (2006.01)

(52) U.S. Cl. .................. 125/13.01; 83/837; 408/217
(58) Field of Classification Search ............. 125/13.01; 83/837; 144/376; 408/217
See application file for complete search history.

(56) References Cited

U.S. PATENT DOCUMENTS

| 118,800 | A | * | 9/1871 | Green | 83/837 |
|---|---|---|---|---|---|
| 149,932 | A | * | 4/1874 | Hogeland | 83/837 |
| 788,236 | A | * | 4/1905 | Bartholomew | 83/837 |
| 1,139,817 | A | * | 5/1915 | Smith | 83/837 |
| 1,269,653 | A | * | 6/1918 | Smith | 83/835 |
| 1,861,218 | A | * | 5/1932 | Huther | 83/835 |
| 2,524,323 | A | * | 10/1950 | Lloyd-Young | 451/509 |
| 3,299,917 | A | * | 1/1967 | Pearson | 83/837 |
| 3,730,038 | A | * | 5/1973 | Farb | 83/837 |
| 4,123,958 | A | * | 11/1978 | Wright et al. | 83/837 |
| 4,930,487 | A | * | 6/1990 | Younger | 125/15 |
| 5,285,768 | A | * | 2/1994 | Messina | 125/15 |
| 5,802,947 | A | * | 9/1998 | Ward et al. | 83/835 |
| 6,641,381 | B1 | * | 11/2003 | Ball | 425/15 |
| 2002/0077043 | A1 | * | 6/2002 | Ball | 451/177 |

* cited by examiner

*Primary Examiner*—Joseph J. Hail, III
*Assistant Examiner*—Bryan Muller

(57) ABSTRACT

This invention relates to tiers of kerf engaging elements at saw blade sides. The tiers recede from the blade's most forward peripheral cutting elements and project laterally to engage the kerf in incremental steps as the blade advances into the material addressed. Each tier is designed to perform a distinctive action. Individual tiers may be designed to plane, or shave, or scratch, or scrape, or sand, or burnish. The mentioned preferred embodiment of this invention submits the kerf to coarse sanding, fine sanding, and burnishing with one pass of the blade.

6 Claims, 2 Drawing Sheets

SAW BLADE WITH VARIED FINISHING ELEMENTS

CROSS REFERENCE TO RELATED APPLICATIONS

This invention is an improvement over my previously filed transmission, Ser. No. 09/634,301, Cnfrm No. 5053, filed 8 Aug. 2000.

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

Saw Blades are commonly manufactured in the form of a disc or a belt with flat sides and cutting elements at the forward peripheral edge. Now and then they are designed with kerf engaging elements, independent of the most forward cutting elements, on one or both sides of the blade body. These elements perform a working action with the forward thrust of the blade and may be broadly categorized as either foreword-sawing or side-acting.

The forward-sawing engaging elements augment the sawing initiated by the most forward peripheral cutting elements.

The side-acting engaging elements have design similarities that limit them to the singular action for which they are intended on any blade.

This invention relates to side-acting kerf engaging elements placed in a plurality of progressively projecting tiers at the side of the saw blade. The kerf engaging elements of each tier perform a distinct working action. The plurality of progressively projecting distinct tiers enable the performance of a plurality of working actions.

Reference is made to the following patents that relate to kerf engaging elements on the sides of saw blades. The kerf engaging elements of these references perform the listed singular action.

| Kullmann et al. | No. 5,425,296 | Jun. 20, 1995 | sawing |
| Messina | No. 5,197,453 | Mar. 30, 1993 | sawing |
| Ward, Jr. et al. | No. 5,802,947 | Sep. 8, 1998 | spacing |
| Young et al. | No. 5,529,528 | Jun. 25, 1996 | sanding |
| Wright et al. | No. 4,123,958 | Nov. 7, 1978 | sawing |
| Pearson | No. 3,299,917 | Jan. 24, 1967 | clearing |
| Ledward | No. 297,816 | Apr. 29, 1884 | planing |

BRIEF SUMMARY OF THE INVENTION

Kerf engaging elements at the sides of the saw blade are positioned in tiers. The kerf engaging elements of any tier project an equal distance laterally from the center plane of the saw blade. Each tier is progressively distanced from the plane of the most forward peripheral cutting element. Each progressive tier projects slightly further laterally from the center plane of the saw blade than any other preceding lateral projection. The kerf engaging elements have a similar configuration and texture on any specific tier. There are, however, design differences from tier to tier. As the blade advances into the material addressed the progressive tiers of kerf engaging elements perform a progression of distinct working actions relative to the kerf, including various grades of sanding, and burnishing.

DETAILED DESCRIPTION OF THE INVENTION

Figure 1:
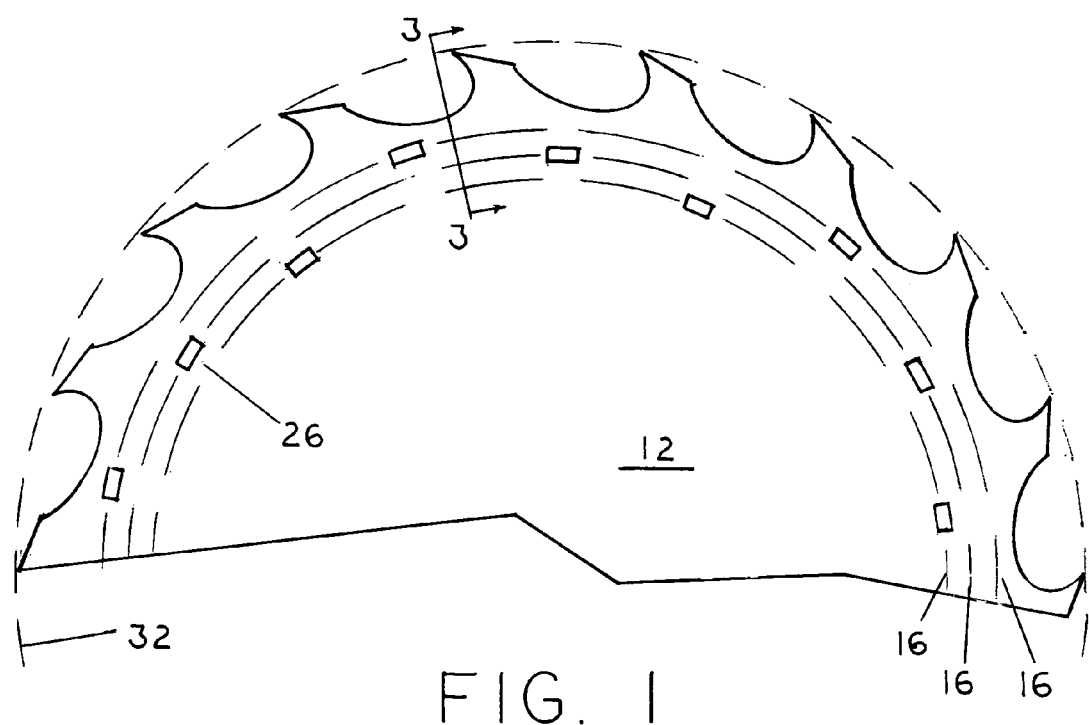
FIG. 1 is a plan view of a circular saw blade illustrating an embodiment of the present invention.

FIG. 1 illustrates units of kerf engaging elements 26 positioned in three tiers 16 on the side of a circular saw blade 12. Each tier 16 is circumferentially parallel to, and placed in a receding progression from the plane of the continuum of the most forward peripheral cutting element 32. Each unit of kerf engaging element 26 is spaced equidistantly on its respective tier 16.

Figure 2:
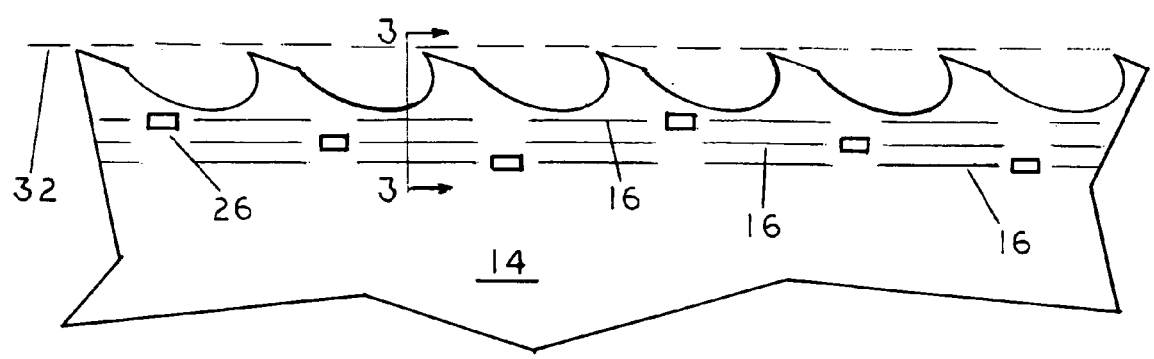
FIG. 2 is a plan view of a band saw blade illustrating an embodiment of the present invention.

FIG. 2 illustrates units of kerf engaging elements 26 positioned in three tiers 16 on a band saw blade 14. Each tier 16 is parallel to, and placed in a progression receding from the plane of the continuum of the most forward peripheral cutting element 32. Each unit of kerf engaging element 26 is spaced equidistantly on its respective tier 16.

Figure 3:
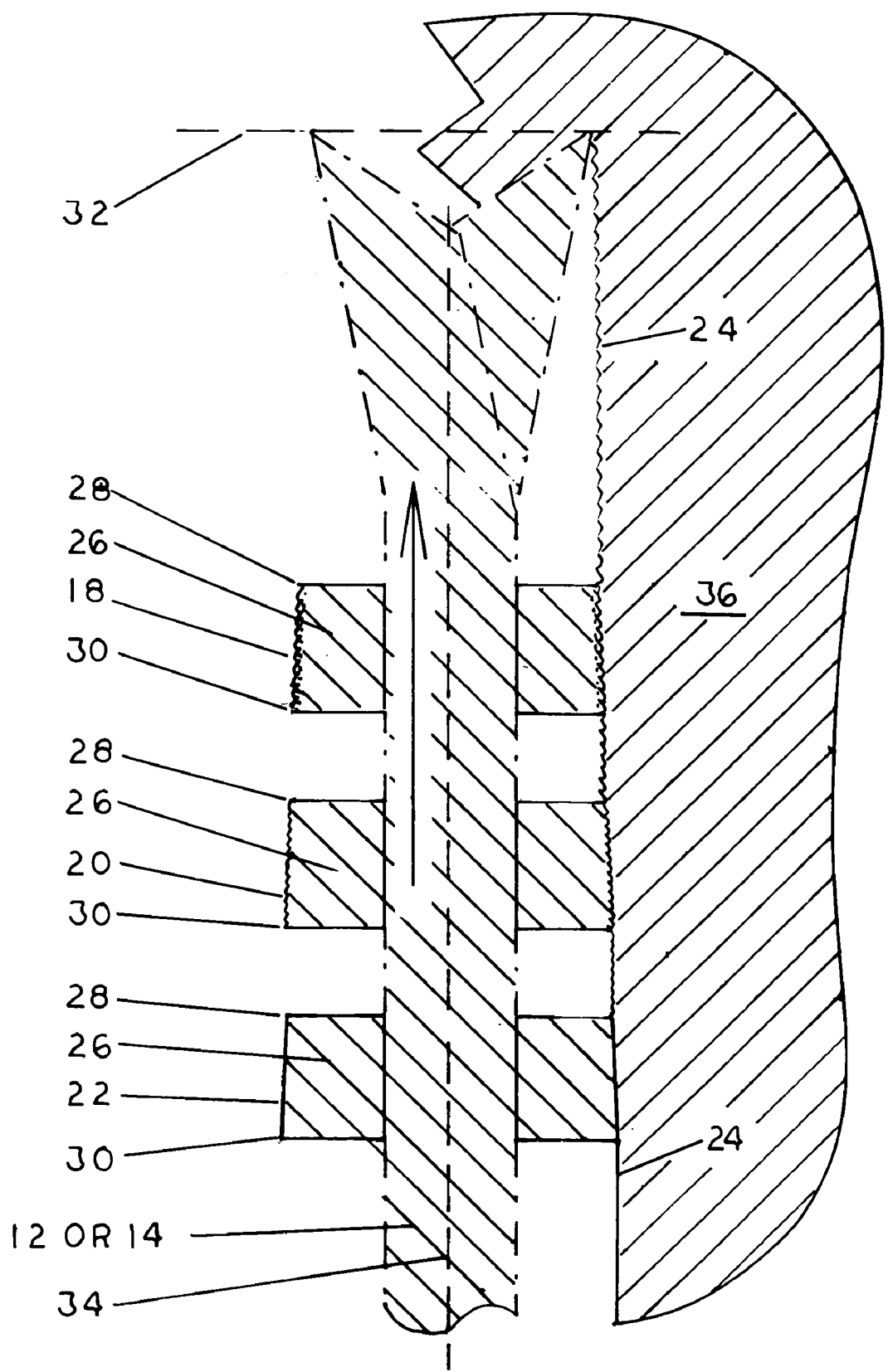
FIG. 3 is a sectional view of a sawing action taken along line 3—3 of FIG. 1, or FIG. 2.

FIG. 3 illustrates three incremental units of kerf engaging elements 26, each with a similar counterpart juxtaposed on the opposite side of the saw blade 12 or 14. Their working surfaces 18, 20, and 22 are coarse abrasive, fine abrasive, and smooth, respectively. The kerf engaging element's leading edges 28 are parallel to the center plane of the saw blade 34, but do not project as far laterally from the center plane of the saw blade 34 as the kerf engaging element's trailing edge 30, which is also parallel to the center plane of the saw blade 34.

As the saw blade advances into the material addressed 36 the first tier of kerf engaging elements 16, consisting of similar units of kerf engaging elements 26, with coarse abrasive working surfaces 18, engages the kerf 24.

Then the second tier of kerf engaging elements 16 consisting of similar units of kerf engaging elements 26, with fine abrasive working surfaces 20, engages the kerf 24.

Then the third tier of kerf engaging elements 16 consisting of similar units of kerf engaging elements 26, with smooth working surfaces 22, engages the kerf 24, thereby, applying pressure, and friction, and heat induced by the the friction, against the kerf 24. The kerf 24 has now been treated to a series of working actions ranging from coarse sanding to smooth burnishing.

Accordingly, the reader will see that the tiers of kerf engaging elements of this invention are a practical addition to the design of saw blades. Said tiers of kerf engaging elements, with each tier performing a particular working action, transform the initial coarsely cut surface of the kerf to a burnished smooth surface with one pass of the blade.

Although the description above contains specificity's, these should not be construed as limiting the scope of the invention but as merely providing illustrations of a presently preferred embodiment of this invention. For example:

The kerf engaging elements when not machined from the saw blade itself, may be attached to the blade by various means, including screwing, riveting, or welding.

The kerf engaging elements may or may not be juxtaposed to each other on opposite sides of the saw blade.

The kerf engaging elements may be designed with varied characteristics, including sharp edges, abrasive surfaces, or smooth surfaces.

Thus the scope of this invention should be determined by the appended claims and their legal equivalents rather than by the examples given.

What I claim as my invention is:

1. A sawing blade comprising flat parallel sides and peripheral forward-positioned teeth as cutting elements that project laterally beyond the plane of the sides of the blade, wherein the improvement being distinct disconnected tiers, spaced apart from one another of finishing elements projecting from both sides of the blade having flat working surfaces all rubbing incrementally tier by tier against the entire kerf as the sawing action of the blade thrusts them through, and wherein each tier consist of a plurality of separately spaced finishing elements and disjoins the material addressed, with said tiers being distinct from the peripheral forward positioned cutting elements, with said tiers parallel to and stepping back from the plane of the continuum of the peripheral forward positioned cutting elements, with said tiers in their receding progression from the peripheral forward positioned cutting elements projecting laterally from the center plane of the saw blade slightly further than any previous lateral projection in tier by tier increments, with said finishing elements having similarly textured working surfaces on any individual tier, with said tiers having dissimilar working surfaces relative to each other, with said tiers in their receding progression from the peripheral forward positioned cutting elements having working surfaces of coarse abrasive on the first tier and progressing tier by tier to surfaces of fine abrasive and to surfaces that are smooth, with said tiers, each in turn bearing against the entire kerf on its side of the blade, performing a distinct step in a collective finishing process, whereby a cutting process using said sawing blade renders both newly cut surfaces with flat, abraded and burnished planes parallel to each other.

2. The sawing blade as recited in claim 1, wherein said finishing elements are elemental part of the saw blade created with the blade as it was machined.

3. The sawing blade as recited in claim 1, wherein said finishing elements are made of the same material as the saw blade.

4. The sawing blade as recited in claim 1, wherein said finishing elements are attached to the saw blade by means selected from the group consisting of welding, and brazing, and riveting, and screwing.

5. The sawing blade as recited in claim 1, wherein said finishing elements comprise design characteristics selected from the group consisting of flared sides, and square edged sides, and beveled sides.

6. The sawing blade as recited in claim 1, wherein the working surfaces of said finishing elements comprise design characteristics selected from the group consisting of, surfaced with abrasive elements, and smooth surfaced.

\* \* \* \* \*